United States Patent [19]
Jacobs

[11] 3,805,610
[45] Apr. 23, 1974

[54] FLOW DIVIDING MEANS, PARTICULARLY FOR THERMAL FLOWMETER

[75] Inventor: David C. Jacobs, Lansdale, Pa.

[73] Assignee: Emerson Electric Co., St. Louis County, Mo.

[22] Filed: June 23, 1972

[21] Appl. No.: 265,642

[52] U.S. Cl. ................................. 73/202, 138/43
[51] Int. Cl. ......................... G01f 1/00, F15d 1/02
[58] Field of Search ................. 73/202, 204, 205 L; 138/40, 43, 44; 73/23

[56] References Cited
UNITED STATES PATENTS

| | | | |
|---|---|---|---|
| 1,884,896 | 10/1932 | Smith | 73/23 |
| 2,586,060 | 2/1952 | Kronberger | 73/202 |
| 3,559,482 | 2/1971 | Baker et al. | 73/202 |
| 3,250,469 | 5/1966 | Colston | 73/205 |
| 3,025,876 | 3/1962 | Wolfe | 137/564.5 |
| 3,374,673 | 3/1968 | Trageser | 73/202 |
| 2,297,817 | 10/1942 | Truxell et al. | 138/40 |

Primary Examiner—Herbert Goldstein
Attorney, Agent, or Firm—Polster and Polster

[57] ABSTRACT

A thermal flowmeter which includes a main flow passage, a laminar flow (capillary) sensor passage connected across the main flow passage and a porous flow divider in the main flow passage between the inlet and outlet of the sensor passage. The porous flow divider element is a sintered 316 series stainless steel cup-shape insert threaded into the main passage. By alternatively utilizing inserts of different lengths and porosities, the flow division may be varied accurately across a wide range.

7 Claims, 5 Drawing Figures

PATENTED APR 23 1974   3,805,610

FLOW DIVIDING MEANS, PARTICULARLY FOR THERMAL FLOWMETER

BACKGROUND OF THE INVENTION

This invention relates to a flow dividing means, and in particular to a flow dividing means for a thermal mass flowmeter. A typical thermal mass flowmeter includes a base, an inlet chamber and an outlet chamber in the base, and a flow sensor capillary tube mounted in the base and forming a communication passage between the inlet chamber and the outlet chamber. A heating coil and a pair of temperature sensitive resistors are wound on the sensor tube. Generally, the heating coil is positioned between the heat sensing resistors, and the temperature differential between the upstream and downstream resistors (or equivalently the current required to maintain a constant temperature differential between the resistors) is taken as a measure of mass flow through the sensor tube. Such meters may measure accurately the flow of small volumes of a particular gas, for example.

When it is desired to meter the flow of a greater quantity of fluid than will conveniently flow through the sensor tube, a flow bypass may be connected between the inlet and outlet chambers of the base, in parallel with the sensor tube. When the required flow division must produce a flow through the bypass which is several times (or more) greater than the flow through the sensor tube, it has been found necessary, in order to achieve a linear flow division across any substantial range of flow values, to include in the bypass a laminar flow element in the form of a bundle of capillary tubes, each approximately the same size as the flow sensor tube. An example of such an approach is shown in Baker, U.S. Pat. No. 3,559,482 (1971). This approach has been more or less successful in providing a linear flow division, but produces a meter which is bulky, which is extremely difficult to manufacture and calibrate (and which is therefore expensive), and which has required that each flowmeter be essentially custom built for a particular metered substance and a particular flow range.

SUMMARY OF THE INVENTION

It is therefore one object of this invention to provide a flowmeter having a flow divider which provides a predictable and linear flow division between a sensor passage and a main or bypass passage.

Another object is to provide a thermal mass flowmeter which has such a flow divider, which is compact and which is relatively easy and inexpensive to manufacture.

Another object is to provide such a flowmeter which may readily be altered to handle different ranges of flow and different metered gases.

Other objects will occur to those skilled in the art in light of the following description and accompanying drawings.

In accordance with this invention, generally stated, a flow division means, particularly useful for use in a thermal mass flowmeter, is provided which includes a casing having an inlet and an outlet, a sensor passage including a laminar flow passage between the inlet and outlet, and a second, larger, passage between the inlet and the outlet with a laminar flow element in the second passage to produce a desired flow division between the sensor passage and second passage, the laminar flow element being made of a porous material through which the metered fluid is flowable. The porous material is preferably sintered metal. Also, the laminar flow element preferably is removably secured in the second passage to permit not only cleaning but the substitution of other laminar flow elements which provide different flow divisions. The laminar flow element is preferably a cup-shaped part, at least a portion of the side wall of which is spaced from an adjacent wall of the second passage.

DESCRIPTION OF THE PREFERRED EMBODIMENT

Figure 1:
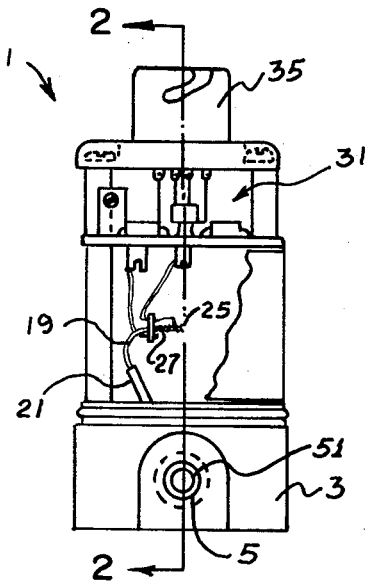
FIG. 1 is a view in end elevation of one illustrative embodiment of thermal flowmeter embodying a flow divider of this invention.

Referring now to the drawings, and in particular to FIGS. 1-4, reference numeral 1 indicates a thermal flowmeter which includes a flow dividing means of this invention. The flowmeter 1 includes a machined metal base 3 having a threaded inlet 5 and outlet 7 in it. The inlet 5 and outlet 7 are connected to each other by a bore 9 through the body 3. Standard couplings 11 and 13 are threaded into the inlet 5 and outlet 7 respectively. A bore 15 forms a passage from the inlet 5 to the upper surface of the base 3 and a similar bore 17 forms a passage from the top of the base to the outlet 7. The ends of capillary sensor tube 19 are joined to the inlet bore 15 and to the outlet bore 17 by a pair of transitions 21 and 23. Each transition 21 and 23 is brazed at one of its ends to the sensor tube 19 and at its other end to the mouth of the bore 15 or 17 respectively. Thus, a second passage consisting of the bore 15, transition 21, sensor tube 19, transition 23 and bore 17 is formed between the inlet 5 and the outlet 7.

The sensor tube 19 is preferably a 316 series stainless steel capillary tube. The sensor tube 19 may have a nominal 0.010 inch inner diameter, a 0.002 wall thickness, and a length of 2.6 inches. The sensor tube 19 is bent to provide a horizontal center span (that is a span which is parallel to the upper face of the base 3). Such a capillary produces approximately 0.30 pounds per square inch pressure drop at a flow of ten standard cubic centimeters per minute. Over a sizable flow range, the pressure drop is almost precisely linearly proportional to flow. This linearity has been measured to be within 0.5 percent, and is probably linear to even greater precision. It should be noted that a high degree of linearity between flow and pressure drop is typical of capillary tubes and is not limited to the particular sensor tube described. Wrapped around the sensor tube 19 are a fine wire heater coil 25, an upstream sensor coil 27 and a downstream sensor coil 29.

By heating a fluid passing through the sensor tube 19 (with the heater coil 25) and measuring the temperature of the fluid upstream (with the coil 27) and downstream (with the coil 29) of the area of heating, it is possible to ascertain the total mass of fluid which is flowing through the tube, in accordance with well-known principles. The sensor coils 27 and 29 are of course highly temperature sensitive resistances, and the difference in their temperatures is determined by a circuit 31.

The circuit 31 generally includes a power source 33 connected to the circuit 31 by a standard electrical connector 35 on the meter 1. As shown in FIG. 1, it is convenient to place the circuitry 31 above the sensor tube 19, so as to isolate the sensor tube 19 as much as possible. A heat shield around the sensor tube compartment also helps to minimize the effects of ambient temperature.

Figure 4:
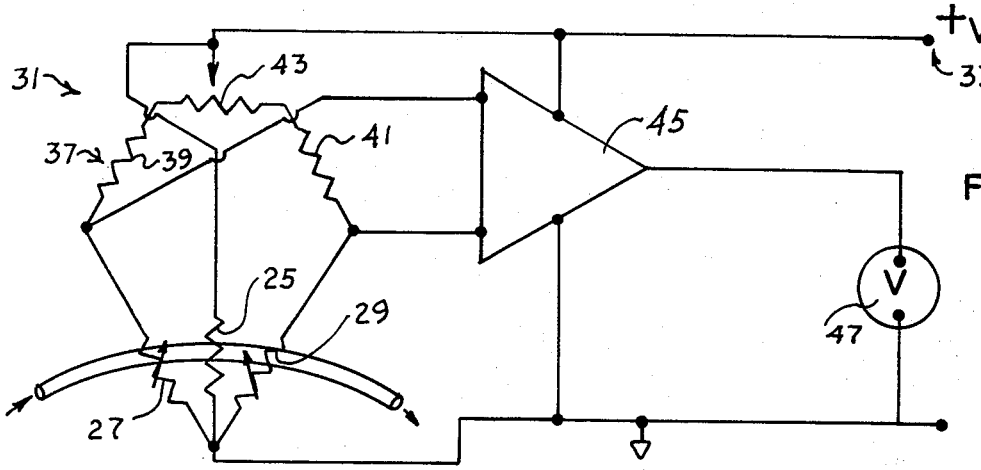
FIG. 4 is a schematic wiring diagram of the flowmeter shown in FIGS. 1-3.

The usual manner of determining the difference in temperature between the temperature-sensitive resistors 27 and 29 is to connect them in a Wheatstone bridge 37 having fixed resistances 39 and 41 and a null adjustment 43. An amplifier 45 is connected across the diagonal of the bridge 37. The output of the amplifier 45 may be used to vary the heating of the coil 25 to maintain a constant temperature difference between the resistance 27 and resistance 29, or, as shown in FIG. 4, the temperature difference may be taken directly as a measure of mass flow, by connecting it to a simple volt meter 47.

As thus far described, the flowmeter 1 is standard. The physical construction is merely a variant on the construction shown in Booth, U.S. Pat. No. 2,594,618. The electrical circuit as shown in FIG. 4 is also well knwon in the art.

Threaded into the outlet 7 is a flow divider 49 of this invention. The flow divider 49 includes a porous metal element 51 and a generally tubular fitting 53. The element 51 is cup-shaped, that is, it is an elongate, hollow shape having a closed end and an open end. Illustratively, the element 51 is cylindrical and has a flat closed end, has an outside diameter of 0.220 inches and an inside diameter of 0.100 inches, and is constructed of sintered 316 series stainless steel. The fitting 53 is swaged to the open end of the element 51. Preferably, the element 51 abuts a shoulder on the fitting 53 to provide a precise depth of fit for the element 51, thereby allowing easy determination of the total exterior surface area of the element 51 when it is mounted in the fitting 53. The fitting 53 is externally threaded and is screwed into a threaded portion of the passage 9 upstream of the sensor passage outlet bore 17. An Allen head socket 55 in the fitting 53 provides an easy means for inserting and removing the flow divider 49 into the passage 9. The threaded fitting 53 forms a fluid-tight seal with the wall of the passage 9, so that all flow through the passage 9 is through the element 51.

Flow through the flow divider 49 is also almost precisely linearly proportional to pressure drop (within 3 percent or less) at least up to the 0.30 pounds per square inch pressure drop of the sensor passage. Therefore, the flow divider 49 provides a precisely linear flow division between the main passage and the sensor passage, over a wide range of lengths and porosities and for a wide range of fluid flow rates. The flow division may be varied easily by varying the length or the porosity of the element 51. Therefore, the flow range of the meter 1 may be varied for a particular gas (the usual metered fluid) merely by removing one flow divider 49 and inserting another, pre-calibrated, flow divider 49.

The cup shape of the element 51 not only provides a large surface area, but permits the flow divider 49 to be calibrated merely by choosing a known (nominal) porosity and a known length of the element 51. Although cutting the element 51 tends to close the pores at the end surface where the cut is made, this surface is not significantly involved in the flow of gas through the cup. Therefore prediction of the flow characteristics through the cup is greatly simplified.

It will be seen that the use of the flow divider 49 of this invention not only provides a highly linear flow division and allows the range of flow of an installed meter to be changed simply, but also permits universal meters to be built which may be adapted to a particular flow range and a particular fluid merely by installing an appropriate flow divider 49.

Merely by way of example, the following table shows typical nitrogen flow at particular lengths and porosities of the element 51 when a 0.30 pounds per square inch pressure drop is applied across the element:

| Nitrogen Flow (standard cubic centimeters) | Length (inches) | Porosity (microns) |
|---|---|---|
| 5000 | 0.60 | 20 |
| 2000 | 0.26 | 20 |
| 2000 | 0.50 | 10 |
| 1000 | 0.27 | 10 |
| 500 | 0.14 | 10 |
| 500 | 0.27 | 5 |
| 500 | 0.62 | 2 |

Of course, similar tables may be made for other fluids, porosities and lengths.

Because the fluid being metered generally is filtered to remove impurities having a much smaller size than 1 micron, the flow dividing means 49 is unlikely to become clogged in use, and is easily removed and cleaned should sufficient clogging occur to impair the accuracy of the meter.

Figure 2:
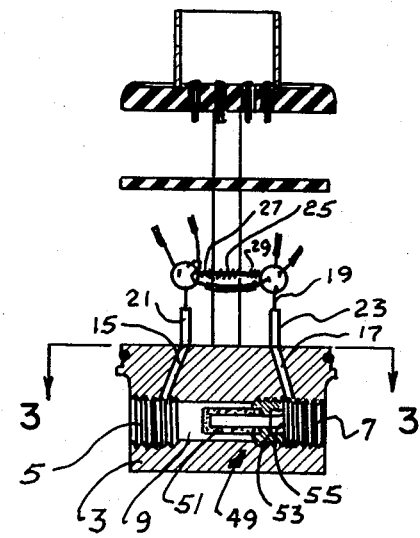
FIG. 2 is a sectional view taken along the line 2—2 of FIG. 1.
Figure 3:
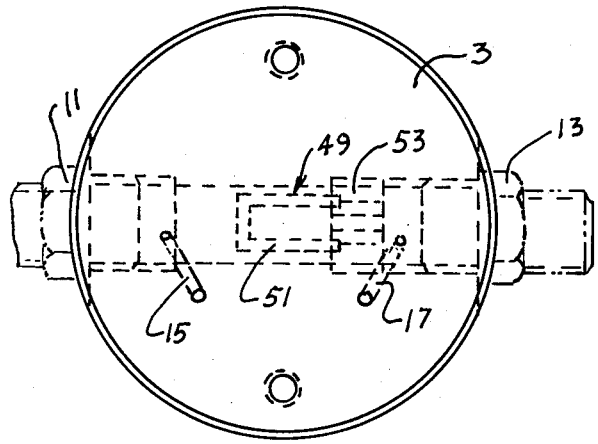
FIG. 3 is a sectional view taken along the line 3—3 of FIG. 2.
Figure 5:
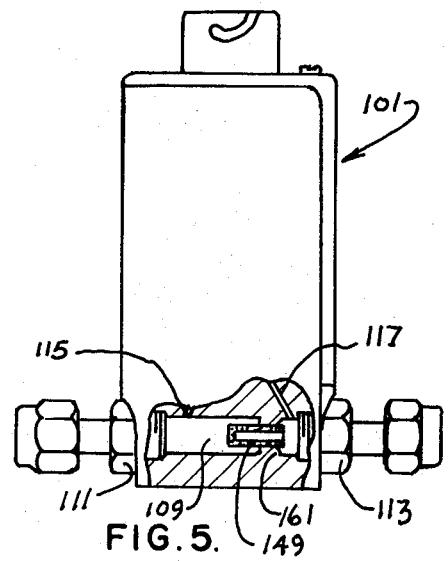
FIG. 5 is a view in side elevation, partially broken away, showing a thermal flowmeter embodying another embodiment of flow divider of this invention.

Although the embodiment of flow divider shown in FIGS. 1–3 is preferred, because it is easily sealed, easily pre-calibrated and easily removed, other configurations of flow divider of this invention are possible. For example, FIG. 5 shows a flow meter 101 which is generally identical with the meter 1 shown in FIGS. 1–3. The meter 101 is shown with a cover installed (the cover has been removed in FIGS. 1–3 for the sake of clarity). An inlet fitting 111 and outlet fitting 113 communicate through a passage 109 in the base of the meter 101 and through a sensor passage (including bores 115 and 117) which is identical with the sensor passage of the first embodiment. Upstream of the outlet bore 117, an annular seat 161 is provided in the passage 109. The seat 161 is machined to form a tight frictional fit with a flow divider element 149. The flow divider element 149 may be identical with the element 51 of the first embodiment. In this embodiment, an element 149 is chosen which is somewaht longer than is required for proper flow division. After the divider 149 is inserted into the seat 161, the meter is tested to determine the flow division produced. The element 149 is then adjusted axially with a suitable tool until the length of the element 149 upstream of the seat 161 produces the desired flow division. It will be seen that this embodiment allows precise adjustment of the flow division for a particular meter and a particular gas. However, the range of the meter is not easily changed, and each meter must be separately calibrated.

Numerous variations in the flow dividing means of this invention, within the scope of the appended claims, will occur to those skilled in the art in light of the foregoing disclosure. For example, the shape and mounting means of the flow divider may be varied. The flow divider element may be made of other porous materials, particularly other sintered metals. The flow divider may be used in other meters which utilize as a sensor passage a capillary or other laminar flow passage obeying capillary laws (particularly linear flow change with change in pressure drop). These variations are merely illustrative.

Having thus described the invention, what is claimed and desired to be secured by Letters Patent is:

1. In a flowmeter for metering a flow of a fluid therethrough, said flowmeter comprising a casing having an inlet and an outlet, a sensor passage between said inlet and said outlet, said sensor passage comprising a laminar flow passage, sensor means associated with said laminar flow passage for detecting flow through said laminar flow passage, and second passage means between said inlet and said outlet, said second passage means having a larger cross sectional diameter than said laminar flow passage, the improvement comprising laminar flow element means in said second passage means for producing a desired flow division between said sensor passage and said second passage means, said laminar flow element means comprising an elongate hollow element having a closed end, an open end and a side wall, at least a portion of said side wall being made of a porous material through which said fluid is flowable and being spaced from an adjacent wall of said second passage means, and securing means for removably securing said hollow element in said second passage means, said securing means comprising a circumferential rib in said second passage means for frictionally holding said side wall of said hollow element, said rib being spaced from said closed end of said hollow element by a distance chosen to provide said desired flow division between said sensor passage and said second passage means, said hollow element being movable relative to said rib for altering said flow division.

2. The improvement of claim 1 wherein said meter is a thermal mass flowmeter, said sensor means including at least one heating means for heating said laminar flow tube and at least two temperature responsive electrical means for sensing a temperature differential in the direction of flow through said laminar flow passage, and circuit means including said heater means and said temperature responsive means for providing a signal indicative of flow.

3. The improvement of claim 2 wherein said porous material is a sintered material.

4. The improvement of claim 3 wherein said sintered material is a sintered powdered metal.

5. The improvement of claim 3 wherein said laminar flow passage comprises a capillary tube.

6. The improvement of claim 1 wherein said side wall of said hollow element has a porosity of from 1 to 50 microns.

7. The improvement of claim 1 wherein said closed end and said side wall are parts of an integrally formed sintered powdered metal element.

* * * * *